United States Patent [19]

Kikuchi et al.

[11] 4,169,881

[45] Oct. 2, 1979

[54] PROCESS FOR REMOVING DISSOLVED SILICA FROM EXTRACTED POSPHORIC ACID

[75] Inventors: Mitsuo Kikuchi; Yoichi Hiraga, both of Shin-nanyo, Japan

[73] Assignee: Toyo Soda Manufacturing Co., Ltd., Yamaguchi, Japan

[21] Appl. No.: 851,411

[22] Filed: Nov. 14, 1977

Related U.S. Application Data

[63] Continuation of Ser. No. 695,054, Jun. 11, 1976, abandoned.

[30] Foreign Application Priority Data

Feb. 13, 1976 [JP] Japan .................................. 51/13947

[51] Int. Cl.$^2$ .............................................. C01B 25/16
[52] U.S. Cl. ................................. 423/321 R; 423/321 S
[58] Field of Search ............... 423/321 S, 321 R, 335; 210/38 R

[56] References Cited

U.S. PATENT DOCUMENTS

| | | | |
|---|---|---|---|
| 2,123,785 | 7/1938 | Knox et al. | 423/321 |
| 2,132,349 | 10/1938 | Booth | 423/321 |
| 3,193,351 | 7/1965 | Miller et al. | 423/321 |
| 3,278,277 | 10/1966 | Goren | 423/321 |
| 3,366,448 | 1/1968 | Martin et al. | 423/321 S |
| 3,454,493 | 7/1969 | Kun et al. | 210/38 R |
| 3,615,195 | 10/1971 | Bierman et al. | 423/321 R |
| 3,907,680 | 9/1975 | Hill | 423/321 R |

*Primary Examiner*—O. R. Vertiz
*Assistant Examiner*—Thomas W. Roy
*Attorney, Agent, or Firm*—Oblon, Fisher, Spivak, McClelland & Maier

[57] ABSTRACT

A method of purifying extracted phosphoric acid containing substantially no metallic impurities which comprises:

(a) adjusting the phosphoric acid concentration to from 20 to 65 wt.% as $P_2O_5$, (b) adjusting the Si/F atomic ratio in said extracted phosphoric acid to less than 0.2; and (c) contacting said extracted phosphoric acid with silica gel at a temperature of 20°–100° C. to remove the dissolved silica from said extracted phosphoric acid; and (d) recovering extracted phosphoric acid having a reduced silica content.

9 Claims, No Drawings

PROCESS FOR REMOVING DISSOLVED SILICA FROM EXTRACTED PHOSPHORIC ACID

This is a continuation of application Ser. No. 695,054 filed June 11, 1976, now abandoned.

BACKGROUND OF THE INVENTION

1. Field of the Invention

The present invention relates to the purification of extracted phosphoric acid, especially to purification involving removal of dissolved silica from the extracted phosphoric acid.

2. Description of the Prior Art

Wet process phosphoric acid prepared by treating a phosphate rock with a mineral acid such as sulfuric acid, hydrochloric acid, nitric acid, and the like, contains metallic component impurities such as aluminum, calcium, sodium, potassium, magnesium, chromium, titanium and the like and also impurities such as mineral acids such as sulfuric acid, fluorine, silica and organic materials. Various techniques have been proposed for purifying wet process phosphoric acid to enable its use for preparation of not only fertilizers but also industrial products, food additives and the like. Purification of wet process phosphoric acid has been conducted industrially.

As mentioned above, silica is dissolved in wet process phosphoric acid with a content usually in the range of from 0.2 to 1 wt%. Various methods of removing such silica from phosphoric acid are known. However, all of the known methods are unsatisfactory for decreasing the silica content to the degree required for use of phosphoric acid as a food additive. For example, a silicofluoride recovery method in which silica is precipitated and separated as siliconfluoride by adding a precipitating agent such as sodium hydroxide, sodium carbonate, sodium chloride, potassium hydroxide and the like is known. However, because of the solubility of the silicon-fluoride, the silica removal coefficient is only about 60–70 wt.% even though an excess of the precipitating agent is used.

Japanese unexamined patent publication No. 34495/1974 discloses a method of removing silica as tetrafluorosilicate by heating phosphoric acid containing silica and fluorine to a temperature higher than 100° C. and injecting steam into the phosphoric acid. In this method, the phosphoric acid containing fluorine is heated to a high temperaure. Accordingly, corrosion of the apparatus used has been difficult to prevent and the amount of steam used must be increased because vaporization of the tetrafluorosilicate decreases in proportion to the decrease in the concentration of silica. Accordingly, the concentration of phosphoric acid is decreased at a ratio of about 5–20 wt% as $P_2O_5$.

It has also been known that a wet process phosphoric acid can be extracted with an organic solvent which dissolves the phosphoric acid and has low solubility to water; alcohols, e.g., n-butanol, isamyl alcohol, isobutanol: ethers; e.g., isopropyl ether; ketones, e.g., methyl-ethyl ketone; phosphoric acid esters, e.g., tributyl phosphate and amines and the like. Thereafter, phosphoric acid is extracted with water from the extracted solution of phosphoric acid. In accordance with this process, metallic component impurities are substantially removed. However, the dissolved silica usually remains in the extracted phosphoric acid in a ratio of 100–3000 wt ppm.

In the specification, the term "extracted phosphoric acid" refers to a phosphoric acid prepared by purification by the extraction method and also to a concentrated phosphoric acid thereof. When the extracted phosphoric acid is concentrated without any other treatment, silica is precipitated as a scale ($SiO_2.nH_2O$) on the surface of the heating tubes of the vaporizer whereby the thermal efficiency is decreased or the tube becomes clogged. When the extracted phosphoric acid is stored, amorphous silica is precipitated causing turbidity and a scale adheres on the surface of the storage tank. When phosphoric acid salts are prepared by using such an extracted phosphoric acid, turbidity of the neutralized mother liquor is caused by the amorphous silica.

Moreover, the inventors have found that various difficulties are caused by the dissolved silica present in the extracted phosphoric acid and have attempted to overcome this trouble. As a result, the inventors have discovered that the dissolved silica is adsorbed by silica gel and that the adsorption coefficient is highly affected by the fluorine content. In order to decrease the amount of dissolved silica in the extracted phosphoric acid, the silica component can be removed from the wet process phosphoric acid. However, the inventors have found that it is superior to treat extracted phosphoric acid with silica gel in comparison with treatment of wet process phosphoric acid with silica gel.

SUMMARY OF THE INVENTION

Accordingly, it is an object of the present invention to provide a method of purification of extracted phosphoric acid in order to substantially decrease the dissolved silica content in the extracted phosphoric acid without causing any difficulties of operation so that the difficulties of scale and turbidity formation can be prevented after the treatment.

This and other objects of the invention as will hereinafter become clear have been attained by providing a method for purification of extracted phosphoric acid which comprises contacting an extracted phosphoric acid having a Si/F (atomic ratio) of less than 0.2 and a concentration of phosphoric acid of from 20 to 65 wt% as $P_2O_5$, with a silica gel at a temperature of 20°–100° C.

DETAILED DESCRIPTION OF THE PREFERRED EMBODIMENTS

Heretofore it has not been suggested from conventional knowledge to remove dissolved silica from phosphoric acid by contacting it with solid silica. In the process of this invention, as stated above, a phosphate rock is treated with a mineral acid such as sulfuric acid, hydrochloric acid and the like and the resulting wet process phosphoric acid is contacted with an organic solvent such as n-butanol, isoamyl alcohol, tributyl phosphate and the like. Thereafter, the resulting extracted solution is back-extracted with water and the extracted phosphoric acid is contacted with silica gel. This extracted phosphoric acid contains substantially no metallic component impurities whereby the difficulties caused by such impurities are not found. If silica gel is contacted with a wet process phosphoric acid containing a large amount of metallic component impurities, the silica gel becomes contaminated with metallic component impurities thereby decreasing its adsorption efficiency. Thus, recovery of the adsorption efficiency by regeneration is required and the overall adsorption efficiency decreases when the operation is repeated.

Wet process phosphoric acid contains 10–150 times the amount of dissolved silica that extracted phosphoric acid contains. Accordingly, the capacity of silica gel for treating phosphoric acid is remarkably decreased for the wet process acid. The extracted phosphoric acid should be contacted with the silica gel after the Si/F (atomic ratio) is adjusted to less than 0.2, preferably 0.1–0.15. When the Si/F (atomic ratio) is higher than 0.2, various difficulties occur. For example, the adsorption efficiency of the silica gel is remarkably decreased, the regeneration of the silica is difficult and the flow of the phosphoric acid is substantially clogged when a packed column is used. However, it is not preferred that the Si/F (atomic ratio) be too small. When a large excess of fluorine to silica is present, the adsorption efficiency of the silica gel is decreased. It is considered that this occurs by breakage of the active sites of the silica gel by the fluorine component. A decrease in the adsorption efficiency of the silica gel can be effectively prevented when the fluorine content in the extracted phosphoric acid is lower than 0.3 wt% and the Si/F (atomic ratio) is lower than 0.2, preferably 0.1–0.15. The Si/F (atomic ratio) in the extracted phosphoric acid varies depending upon the type of phosphate rock, the composition of the wet process phosphoric acid, the type of organic solvent, the number of stages and the flow rate used in the extraction process. Accordingly, it is necessary to adjust the Si/F (atomic ratio) of the extracted phosphoric acid in contact with the silica gel.

The method used to adjust the Si/F (atomic ratio) of the extracted phosphoric acid is not critical. For example, it is possible to add a fluorine compound such as hydrofluoric acid, ammonium fluoride, sodium fluoride and the like. Moreover, addition of the fluorine compound need not be performed just prior to contacting the extracted phosphoric acid with the silica gel. For example, when the contact with the silica gel is conducted after concentrating the extracted phosphoric acid, it is possible to add the fluorine compound in the concentration step. It is sufficient to adjust the Si/F (atomic ratio) or the extracted phosphoric acid which is contacted with the silica gel to less than 0.2.

The extracted phosphoric acid should be contacted with the silica gel at 20°–100° C. When the temperature is higher than 100° C., the silica gel breaks and the adsorption efficiency is decreased. Also, the flow of the phosphoric acid becomes clogged when a packed column is used. The reason for this is not clear, but is theorized that it is caused by the high activity of the fluorine component to the silica gel. When the temperature is lower than 20° C., the adsorption speed is remarkably low.

Furthermore, the extracted phosphoric acid should be contacted with the silica gel with an adjusted concentration of the extracted phosphoric acid of 20–65 wt% as $P_2O_5$. The adsorption efficiency is very low outside this range. The concentration of the extracted phosphoric acid solution prepared by treating the wet process phosphoric acid by the extraction method is usually in the range of 20–40 wt% as $P_2O_5$. Accordingly, such an extracted phosphoric acid solution can be used without further concentration. However, when the concentration of the phosphoric acid is in the range of 45–60 wt% as $P_2O_5$, the adsorption of the silica is the highest. Accordingly, it is very effective to perform the silica gel treatment after concentration of the extracted phosphoric acid solution to this range.

The type of silica gel used is not critical and conventional silica gels used for adsorption can be used. It is preferred to use a silica gel having a lower alumina content. Suitable commercial silica gels include Dokai gel A, Dokai gel B, Hishihead N and the like (manufactured by Dokai Kaguka Kogyo K.K.), Tokai gel A, Tokai gel B (manufactured by Tokai Kaguka Kogyosho K.K.); and Silbead N, Silbead W and the like, (manufactured by Mizusawa Kaguku Kogyo K.K.). The size of the silica gel to be used depends upon the method of contacting the extracted phosphoric acid with it. Preferably, it is in the range of 4–50 mesh.

In the method of contacting the extracted phosphoric acid with the silica gel, the silica gel can be added to the extracted phosphoric acid and separated after adsorpton of the silica component. However, in order to most effectively remove the silica component, it is preferred to pass the extracted phosphoric acid through a column filled with the silica gel. In the latter case, a suitable flow rate of the extracted phosphoric solution is 0.1–10 $hr^{-1}$ as space velocity. Thereby, the silica component is adsorbed on the silica gel although the adsorption mechanism is not clear. However, the silica gel containing the adsorbed silica component can be regenerated by washing it with water or a diluted aqueous solution of alkali. In this light, it is theorized that the adsorption is caused by Van der Waals attraction, physical adsorption, molecular sieve effect or ion-exchange adsorption. The concentration of the dissolved silica in the extracted phosphoric acid can be decreased to a value less than 30 wt ppm under the above mentioned conditions. The silica gel containing the adsorbed silica component can be easily regenerated in substantially full degree by washing it with water or a diluted aqueous solution of alkali at a temperature higher than 10° C., preferably 40°–80° C. When the silica gel is filled into a packed column, it is preferred to pass water or the diluted aqueous solution of alkali at a space velocity of 0.5–10 $hr^{-1}$, especially 1–3 $hr^{-1}$. The cycle of adsorption-regeneration can usually be repeated more than 10 times. When the extracted phosphoric acid contains a large amount of organic material, the organic material covers the surface of the silica gel, thereby decreasing the adsorpton efficiency and the regeneration efficiency. Accordingly, in this case, it is preferred to contact the extracted phosphoric acid with the silica gel after removal of the organic materials, such as by decoloration with active carbon or an oxidizing agent. As noted above, in order to maintain the adsorption efficiency of the silica gel for a long period of time, it is preferred that the silica component in the extracted phosphoric acid be removed as much as possible before the treatment with the silica gel.

Having generally described the invention, a more complete understanding can be obtained by reference to certain specific examples, which are included for purposes of illustration only and are not intended to be limiting unless otherwise specified.

In the examples, the terms "%" and "ppm" are respectively % by weight and ppm by weight, R represents a metal element.

EXAMPLE 1 and REFERENCE EXAMPLES 1 and 2

Calcined phosphate rock (Morocco) was treated with sulfuric acid and a portion of the silica was removed by the silicofluoride-recovery method using sodium hydroxide to obtain a wet process phosphoric acid ($P_2O_5$ —34.5%; $SiO_2$ —0.166%; $R_2O_3$ —1.2%). The wet process phosphoric acid was contacted with n-butanol in a multistage counter-current extraction and the resultant extracted solution of phosphoric acid was back-extracted with water. The resulting extracted phosphoric acid solution was admixed with hydrofluoric acid and was concentrated under a reduced pressure to obtain an extracted phosphoric acid ($P_2O_5$ —60.2%; $SiO_2$ —150 ppm; $R_2O_3$ —10 ppm; Si/F (atomic ratio) —0.15). A 20.0 g sample of silica gel (Dokai gel A: manufactured by Dokai Kaguka Kogyo K.K.) was added to 300 g samples of the extracted phosphoric acid and the mixture was stirred at the following temperatures for about 10 hours. The silica gel was then separated. The silica contents as $SiO_2$ are shown in the table.

|  | Reference Example 1 | Example 1 | Reference Example 2 |
| --- | --- | --- | --- |
| Temperature for treatment (° C.) | 15 | 50 | 120 |
| Silica content ($SiO_2$ ppm) | 95 | 20 | 70 |

EXAMPLE 2

Phosphate rock (Morocco) was treated with sulfuric acid and the resulting phosphoric acid solution was concentrated under a reduced pressure to obtain a wet process phosphoric acid ($P_2O_5$—54.5%; $SiO_2$ —0.23%; $R_2O_3$ —1.7%). The wet process phosphoric acid was contacted with tributyl phosphate in a multi-stage counter-current extraction and the extracted solution of phosphoric acid was back-extracted with water. The resulting extracted phosphoric acid solution was concentrated under a reduced pressure to obtain a brown, extracted phosphoric acid ($P_2O_5$ —50.8%; $SiO_2$ —280 ppm; $R_2O_3$ —20 ppm; Si/F (atomic ratio) —0.31). Hydrofluoric acid was added to the extracted phosphoric acid to produce an Si/F (atomic ratio) of 0.15 and active carbon was added at a ratio of 0.5% to the amount of $P_2O_5$. The active carbon was filtered. The resulting colorless phosphoric acid was passed through a column having an inner diameter of 2.1 cm, which was filled with silica gel (Dokai gel A) at a height of 100 cm at 70° C. using a flow rate of 150 g/hr for 10 hours. The silica content of all of the resulting phosphoric acid was less than 30 ppm as $SiO_2$.

REFERENCE EXAMPLE 3

In accordance with the process of Example 2, the extracted phosphoric acid of Example 2 was treated without the addition of hydrofluoric acid, by using active carbon and silica gel. As a result, the flow of the phosphoric acid was stopped after about 5 hours from the initiation and operation was stopped.

EXAMPLE 3

The silica gel used in the process of Example 2 was recovered by passing 10 liters of water through the column filled with the adsorbed silica gel at 50° C. under a space velocity of 2.0 hr$^{-1}$, in accordance with the process of Example 2. The adsorption recovery operation was repeated 5 times. In every case, the silica content in the phosphoric acid was less than 30 ppm.

REFERENCE EXAMPLE 4

Phosphate rock (Morocco) was treated with sulfuric acid and the resulting phosphoric acid solution was concentrated under a reduced pressure to obtain a wet process phosphoric acid ($P_2O_5$—50.6%; $SiO_2$ —0.2%; $R_2O_3$ —1.5%; Si/F (atomic ratio) —0.15). In accordance with the process of Example 2, the wet process phosphoric acid was treated with active carbon and silica gel. Although a phosphoric acid having a silica content of less than 30 ppm as $SiO_2$ was obtained for 50 g of the acid at the initial stages, the silica content of the phosphoric acid thereafter was increased to higher than 30 ppm. After the operation for 10 hours, the silica gel was recovered under the conditions of Example 3 and the adsorption treatment was repeated. The adsorption-recovery operation was repeated 5 times. In the second and following treatments, a phosphoric acid having a silica content of less than 30 ppm was not obtained. The silica content in the phosphoric acid at the initial stage of the fifth treatment was 500 ppm as $SiO_2$.

EXAMPLE 4

Calcined phosphate rock (Florida) was treated with hydrochloric acid and the resulting wet process phosphoric acid was contacted with isoamyl alcohol in a multi-stage counter-current extraction. The extracted solution of phoshoric acid was back-extracted with water. The resulting extracted phosphoric solution was concentrated under a reduced pressure. Hydrofluoric acid was added to it to obtain an extracted phosphoric acid ($P_2O_5$ —54.9%; $SiO_2$ —0.03%; $R_2O_3$ —15 ppm; Si/F (atomic ratio) —0.13). The resulting extracted phosphoric acid was continuously passed through a column which was filled with 1 liter of silica gel (Tokai gel, manufactured by Tokai Kaguku Kogyo sho) to a height of 150 cm, at a flow rate of 200 g/hr for 24 hours. At the final stage of the operation, the silica content in the phosphoric acid was still less than 30 ppm.

REFERENCE EXAMPLE 5

In accordance with the process of Example 4, a diluted phosphoric acid prepared by diluting the extracted phosphoric acid of Example 4 with water to a concentration of 15% of $P_2O_5$ was treated. After 24 hours from the initiation of the operation of passing it through the column filled with silica gel, the silica content in the phosphoric acid was 80 ppm as $SiO_2$. The silica gel was inactivated at that stage.

REFERENCE EXAMPLE 6

The extracted phosphoric acid of Example 4 was concentrated under a reduced pressure to obtain an extracted phosphoric acid having a higher concentration ($P_2O_5$ —67.3%; $SiO_2$ —130 ppm; Si/F (atomic ratio) —0.1). In accordance with the process of Example 4, the extracted phosphoric acid having the high concentration was treated. As a result, a phosphoric acid having a silica content of less than 30 ppm as $SiO_2$ was not obtained.

Having now fully described the invention, it will be apparent to one or ordinary skill in the art that many changes and modifications can be made thereto without departing from the spirit or scope of the invention as set forth herein.

What is claimed as new and intended to be coverd by Letters Patent is:

1. A method of reducing the silica content of extracted phosphoric acid containing substantially no metallic impurities and having a fluorine content of less than 0.3 wt % as F., which comprises:
   (a) adjusting the phosphoric acid concentration to from 20 to 65 wt.% as $P_2O_5$;
   (b) adjusting the Si/F atomic ratio in said extracted phosphoric acid to from at least 0.1 to less than 0.2;
   (c) contacting said extracted phosphoric acid with silica gel at a temperature of 20°–100° C. to remove the dissolved silica from said extracted phosphoric acid; and
   (d) recovering extracted phosphoric acid having a reduced silica content with respect to the acid produced in step a.

2. The method of claim 1, wherein an extracted phosphoric acid having a Si/F (atomic ratio) of from 0.1 to 0.15 is contacted with silica gel.

3. The method of claim 1, wherein the Si/F (atomic ratio) in the extracted phosphoric acid is first adjusted by addition of a fluorine containing compound.

4. The method of claim 1, wherein the extracted phosphoric acid is first adjusted to have a concentration of 45–60 wt% as $P_2O_5$ and is then contacted with silica gel.

5. The method of claim 1, wherein the extracted phosphoric acid is contacted with silica gel by passage through a column filled with silica gel.

6. The method of claim 1 wherein said extracted phosphoric acid containing substantially no metallic impurities is prepared by contacting wet process phosphoric acid with n-butanol, isoamyl alcohol or tributyl phosphate to extract phosphoric acid and then contacting this extracted solution with water.

7. The method of claim 6, wherein the wet process phosphoric acid is prepared by treating a phosphate rock with sulfuric acid or hydrochloric acid.

8. The method of claim 1, wherein organic materials are removed from the extracted phosphoric acid before it is contacted with slica gel.

9. The method of claim 1, wherein the Si/F atomic ratio is adjusted to from 0.1 to 0.15.

* * * * *